Sept. 17, 1929.　　　A. F. MASURY　　　1,728,872
FLEXIBLE CONNECTION FOR MOTOR VEHICLE PANELS
Filed Sept. 1, 1928
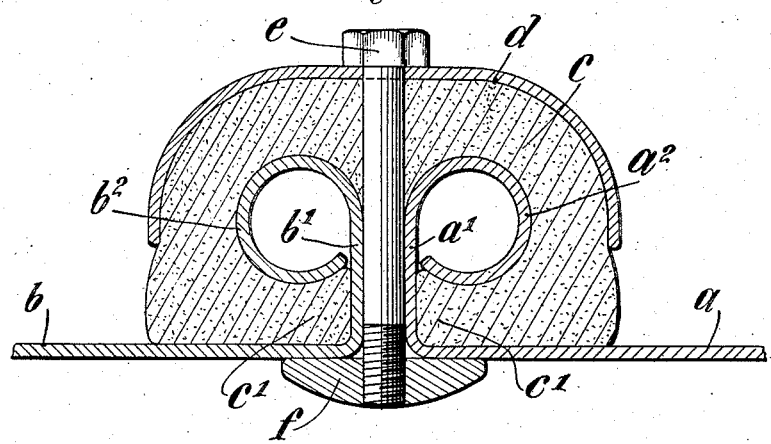
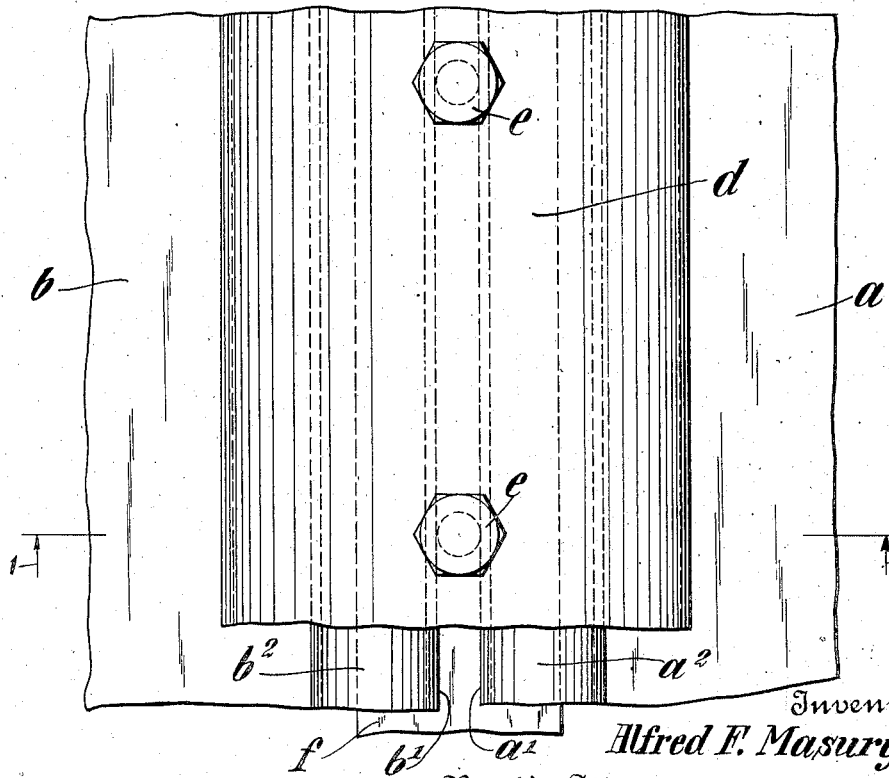
Inventor
Alfred F. Masury,
By his Attorneys
Redding, Greeley & Lea & Campbell Patented Sept. 17, 1929

1,728,872

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,463.

The present invention relates to an improved panel construction for motor vehicle design and, more specifically, includes a connection between adjacent panels which is capable of securing such panels effectively while permitting a degree of movement therebetween without impairing the connection and, at the same time, eliminating the body squeaks and drumming which have characterized many types of body designs which have employed panels of this character.

An object of the invention is to provide a connection of the above character which is constructed in a manner to enable it to be manufactured easily by simple stamping and rolling operations, thus materially reducing the cost thereof. A further object is to afford a connection of the above character which effectively secures adjacent panels together and permits a degree of movement therebetween without weakening the connection.

More particularly, in accordance with the present embodiment, adjacent panels are provided with parallel flanges between which bolts extend to space the panels properly. A non-metallic yielding moulding is secured between a cover strip and a bead which engages the panels on the side opposite from the flanges, the bolts serving to maintain a predetermined degree of compression in the moulding.

Further objects, such as the elimination of body squeaks and drumming, etc., will be apparent as the invention is described more fully and reference will now be had to the accompanying drawings, wherein:

Figure 1 is a view in section taken on line 1—1 of Figure 2, and looking in the direction of the arrows, showing a preferred form of connection.

Figure 2 is a plan view of the connection shown in Figure 1.

Referring to the above drawings, $a$ designates a panel which is to be used in the construction of a vehicle body, the panel having an angular extension $a'$, the extremity of which is rolled back as at $a^2$. Adjacent panel $b$ is formed with a similar extension $b'$ having a similar rolled back extremity $b^2$ and a strip of yielding non-metallic moulding $c$, which is generally M-shaped in cross section, is formed with inwardly extending portions $c'$ to engage the recesses formed between the panels and the angular extensions thereof. The moulding may be formed of rubber in its preferred form and a metallic strip $d$ fits over the moulding and is secured in place by means of a bolt $e$ extending between the angular portions $a'$ and $b'$ and engaging a bead $f$ on the other side of the panels. The edges of the strip $d$ extend downwardly to lie opposite the sides of the turned back portions $a^2$ and $b^2$ thus providing a backing, between which and the turned back portion, a portion of the moulding lies to resist separation of the panels.

The bolts, in the foregoing construction, serve as a means for spacing, positively, the panels apart, relative movement responsive to forces tending to separate the panels being accommodated yieldingly by the moulding.

It will be seen that the degree of compression set up in the moulding may be varied as desired to vary the rigidity of the connection. The rubber moulding effectively secures the panels together while permitting a degree of movement therebetween to permit weaving of the body without setting up injurious stresses therein. The specific form of the connection may be varied without departing from the scope of the invention as defined in the appended claim.

I claim as my invention:

A connection of the character described comprising a panel, an adjacent panel to be connected thereto, flanges on the panels, turned back extremities on the flanges, non-metallic yielding moulding for the flanges having portions lying between the turned back extremities and the respective panels, a cover strip for the moulding having portions which extend in spaced relationship with respect to the sides of the flanges and turned back extremities, a bead on the side of the panels opposite the cover strip, and means passing between the flanges and through the moulding for securing the bead to the cover strip.

This specification signed this 27 day of August, A. D. 1928.

ALFRED F. MASURY.